B. S. KURTZ.
SPEED CHANGING MECHANISM.
APPLICATION FILED JULY 20, 1917.

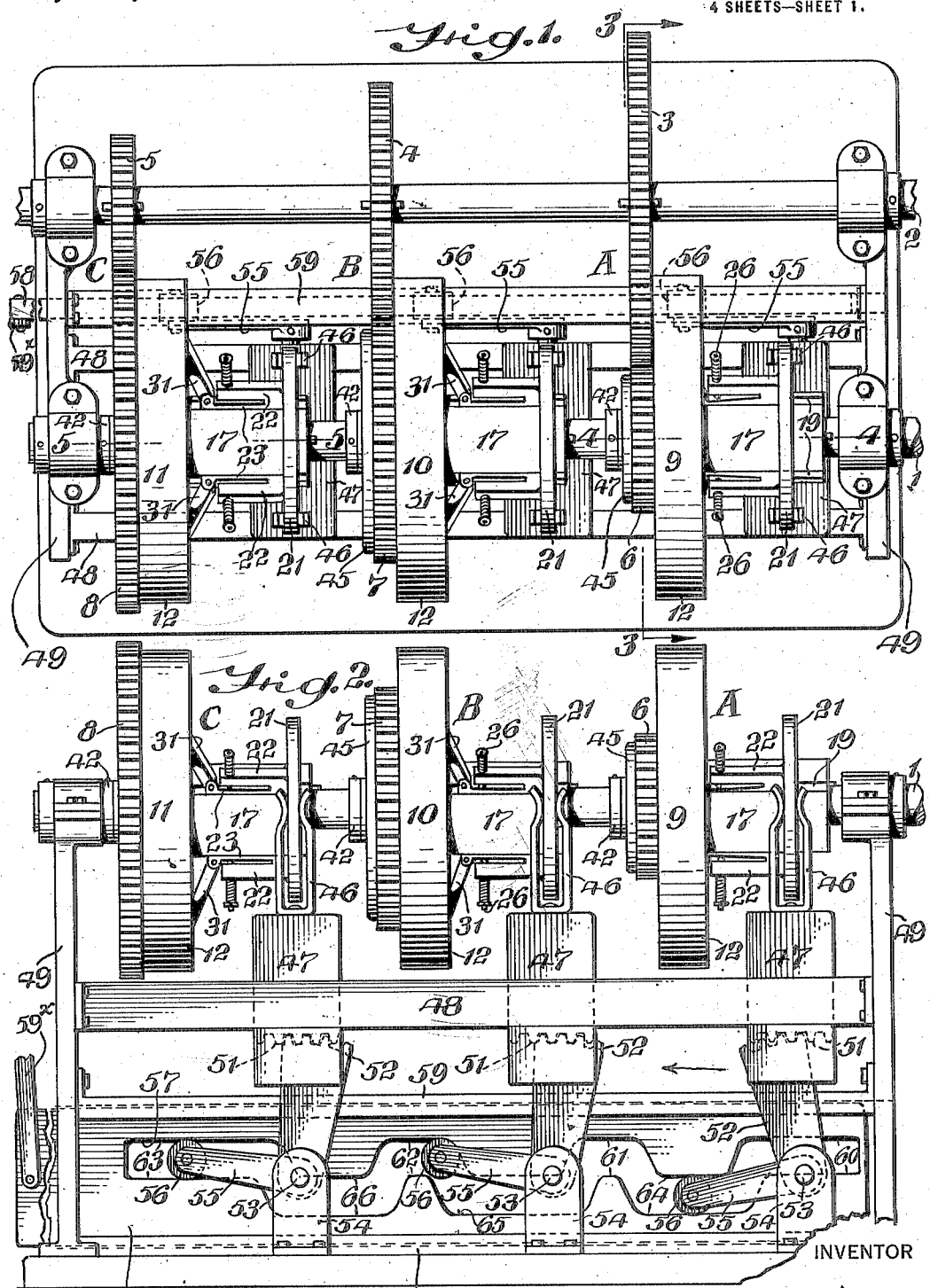

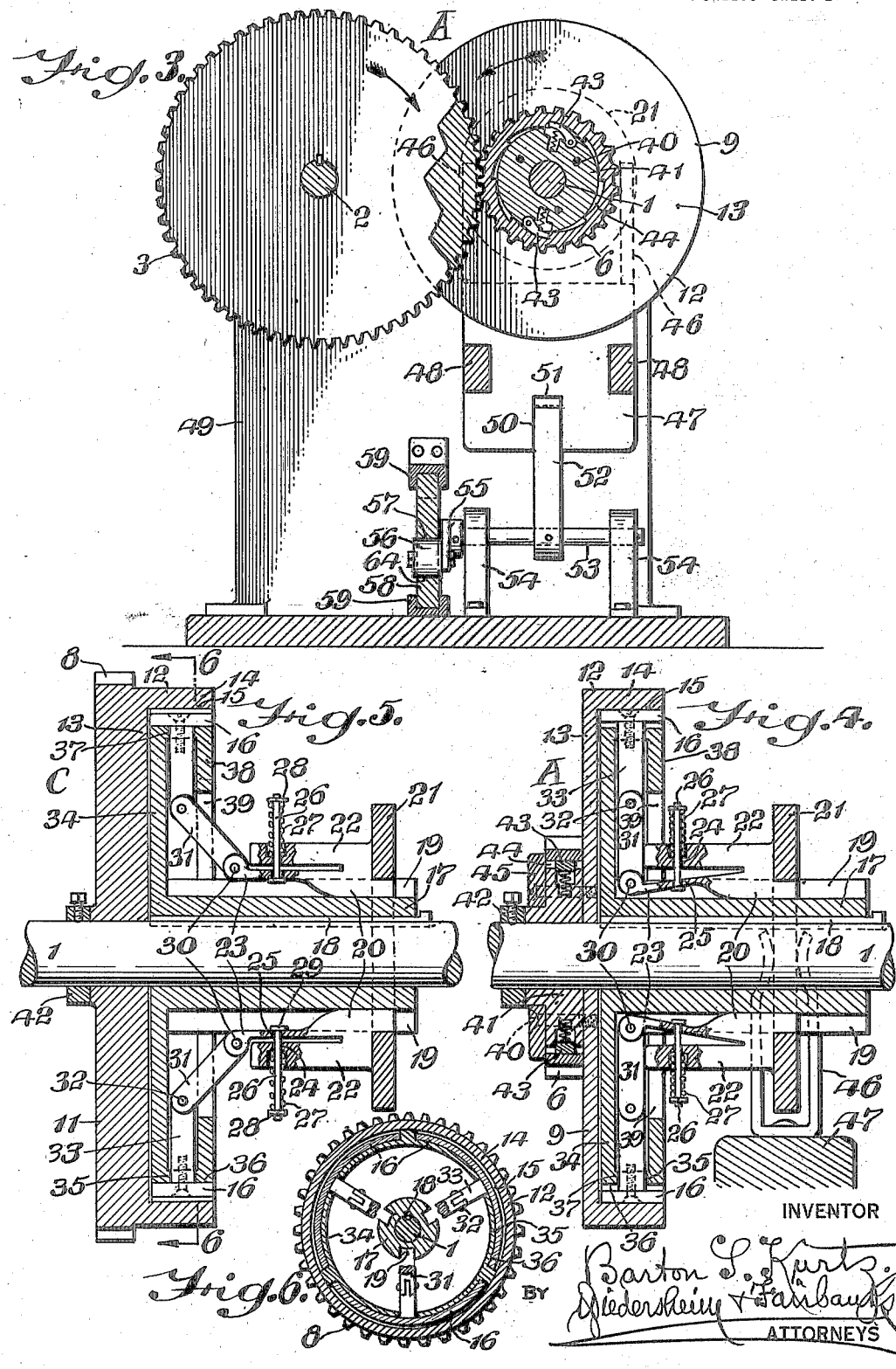

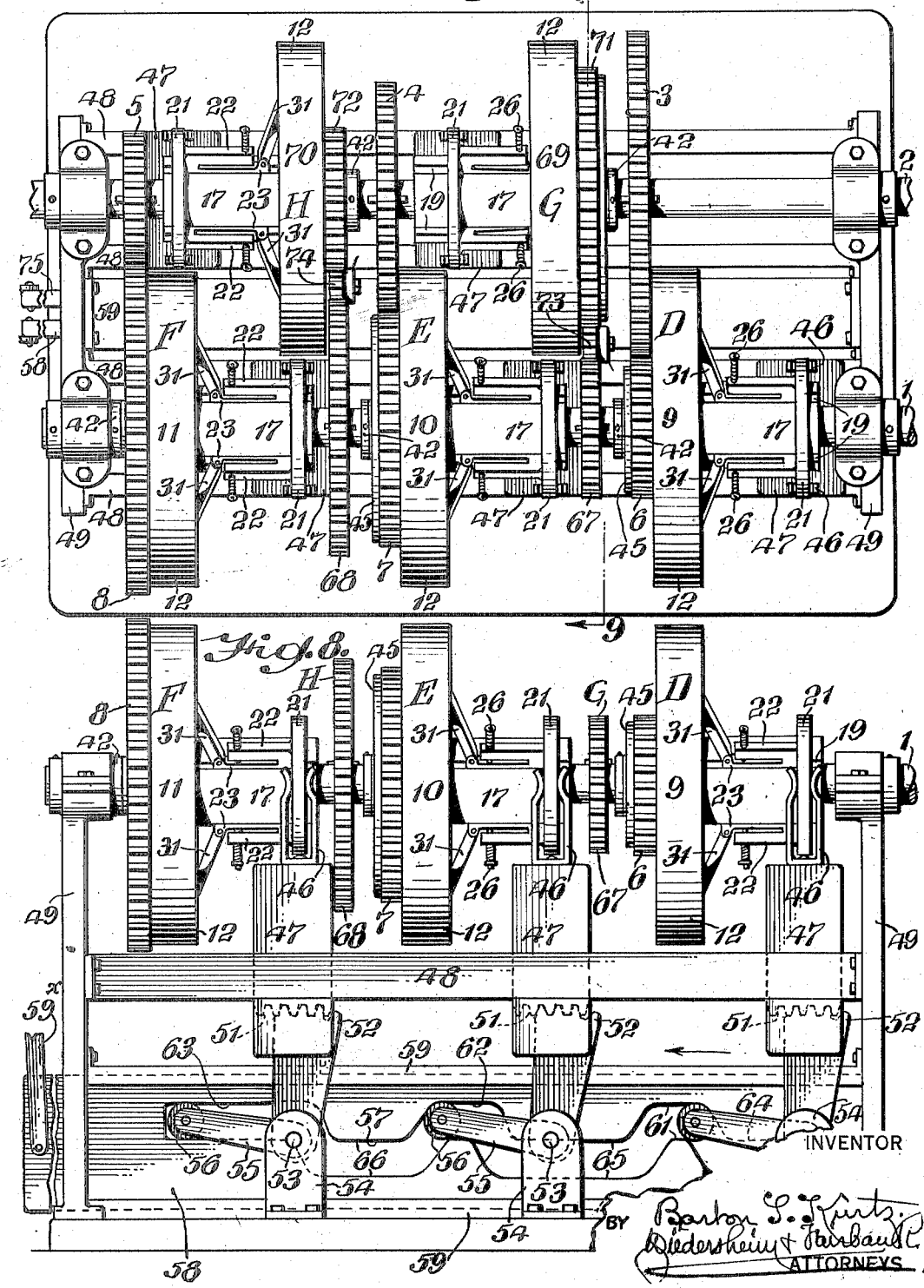

1,249,780.

Patented Dec. 11, 1917.
4 SHEETS—SHEET 4.

INVENTOR
Barton S. Kurtz.
BY
Diedersheim + Fairbanks
ATTORNEYS

UNITED STATES PATENT OFFICE.

BARTON S. KURTZ, OF GAP, PENNSYLVANIA.

SPEED-CHANGING MECHANISM.

1,249,780. Specification of Letters Patent. Patented Dec. 11, 1917.

Application filed July 20, 1917. Serial No. 181,748.

*To all whom it may concern:*

Be it known that I, BARTON S. KURTZ, a citizen of the United States, residing at Gap, in the county of Lancaster, State of Pennsylvania, have invented a new and useful Speed-Changing Mechanism, of which the following is a specification.

My invention relates to speed changing mechanism and more particularly to that type of speed changing mechanism disclosed in my application, Serial No. 156,816, filed March 23rd, 1917.

The principal object of my invention is to provide a novel mounting for the transmission gears together with means for positively holding a selected gear to revolve with the shaft for the transmission of motion of the desired speed ratio and direction to the driven shaft or axle.

A further object of my invention is to provide a clutch mechanism in connection with the transmission gears which consists of expansible clutch shoes adapted to be positively expanded and contracted in the operation of the device.

A still further object of my invention is to provide a speed changing mechanism wherein means are provided for the transmission of direct motion together with means for producing a reverse motion.

A still further object of my invention is to provide clutch controlled gears loosely mounted on the driving and driven shafts constantly in mesh with gears fixed to the said shafts to produce gear units of different speed ratios together with cam means for selectively actuating said clutch mechanism of any one of said clutch controlled gears to hold the same in a fixed relation to its respective shaft and transmit motion of the desired speed ratio and direction.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a top plan view of my improved speed changing mechanism showing the gear of the low speed ratio in a locked relation to the driving shaft.

Fig. 2 represents a front elevational view of Fig. 1, showing the shiftable cam bar and mechanism operated thereby in operative connection with the gears on the driving shaft.

Fig. 3 represents a section on the line 3—3 Fig. 1 showing the elastic connecting means between the gears of the change speed mechanism and the driving shaft with the gear members of the driving shaft loosely mounted thereon.

Fig. 4 represents a section on the line 4—4 Fig. 1, through the gear member of the low speed ratio showing the mounting thereof on the driving shaft with the clutch mechanism operated to hold the gear in fixed relation to the driving shaft also showing elastic connecting means between the gear and the clutch drum.

Fig. 5 represents a section on the line 5—5 Fig. 1, through the gear member of the high speed ratio showing the mounting thereof on the driving shaft with the clutch mechanism in an inoperative position, also showing the gear integral with the clutch drum.

Fig. 6 represents a section on the line 6—6 Fig. 5, showing the expansible clutch shoes in relation to the drum of which the gear forms a part.

Fig. 7 represents a top plan view of another embodiment of my invention in which is included a reversing mechanism between the driving and driven shafts.

Fig. 8 represents a front elevational view of Fig. 7 showing the gear members of the different speed ratios on the driving shaft together with a shiftable cam bar and mechanism operated thereby in operative connection with the gears on the driving shaft.

Figure 9:
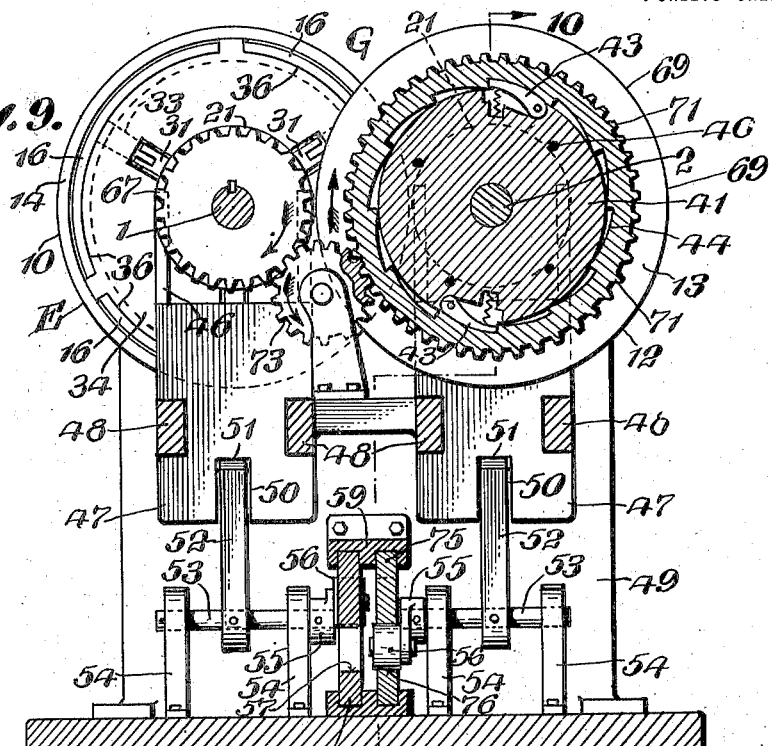
Fig. 9 represents a section on the line 9—9 Fig. 7 illustrating the manner of reversing the motion of the driven shaft.
Figure 10:
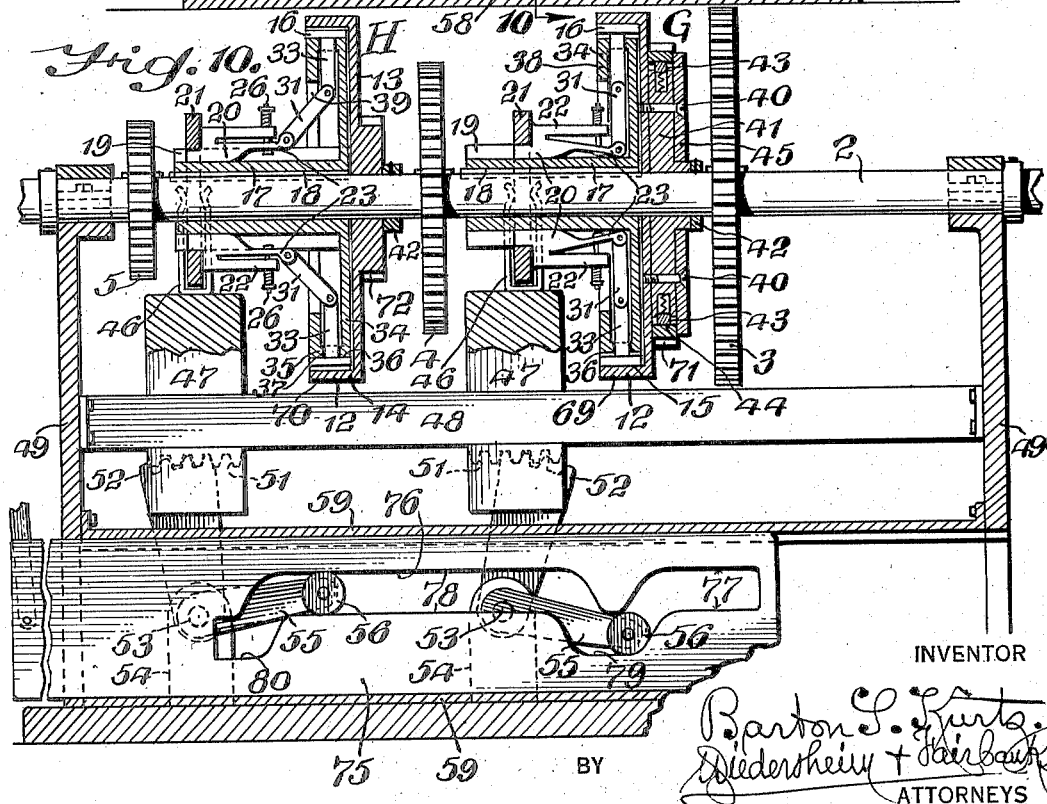
Fig. 10 represents a section on the line 10—10 Fig. 9, showing the reversing gear members on the driven shaft in section, together with a second shiftable cam bar for operating the said gear members.

Referring more particularly to Figs. 1, 2, 3, 4, 5, and 6 of the drawings in which a form of the device is shown wherein a direct transmission of different speed ratios is effected, 1 designates the driving shaft, 2 the driven shaft or axle between which my improved speed changing mechanism is interposed, and consists namely of a plurality of gear units, the drawings illustrating the three gear units A, B and C, representing the low, intermediate and high speed ratios.

These gear units comprise the gears 3, 4, and 5 fixed to the driven shaft and constantly intermeshing with the gears 6, 7 and 8 of the gear members 9, 10 and 11 loosely positioned on the driving shaft 1 and forming a part of the speed changing mechanism.

As the speed changing mechanisms of the different gear units are of the same construction, the description of one will answer for all, with the exception of a slight modification in the gear member 11 of the high speed unit, which will hereinafter be referred to.

For the purpose of clearness in description I will refer to the gear unit A of the low speed ratio which consists of the gear 3 of a large pitch diameter fixed to revolve with the driven shaft 2 and in constant mesh with the gear 6 of a smaller pitch diameter loosely mounted on the driving shaft 1, and forming a part of my improved speed changing mechanism.

The gear member 9 comprises a drum 12 loosely mounted on the driving shaft 1, and this drum consists of the side wall 13 and the peripheral flange 14, the internal face 15 of which is adapted to be engaged by the expansible clutch shoes 16 held to revolve with the driving shaft 1. The mounting of the clutch shoes 16 on the driving shaft 1 consists of the collar 17 keyed at 18 to the driving shaft and provided with the longitudinal grooves 19 in which the keys 20 of the cam controlled disk 21 are positioned. The disk 21 is provided with the rigid extensions 22, and the resilient extensions 23 perforated at 24 and 25 for the reception of the bolts 26 on which are positioned the springs 27 which are located between the upper face of the rigid extensions 22 and the adjustable nuts 28 of the bolts 26, with the heads 29 of the bolts 26 engaging the under face of the resilient extensions 23.

The outermost portion of the resilient extensions 23 is enlarged and bifurcated to form a pivot connection 30 for the link 31, which in turn is pivoted at 32 to the rigid extension 33 of the clutch shoe 16.

The collar 17 is provided with an integral hollow enlargement 34, the peripheral rim 35 of which is cut out as at 36, see Fig. 6, to form a seat for the clutch shoes 16. This peripheral rim is also provided with openings 37 through which the extensions 33 pass, while the side wall 38 of the enlargement 34 is cut out as at 39 to allow for the inward movement of the rigid and resilient extensions 22 and 23 when the disk 21 is operated by cam means which will be more fully hereinafter described.

The side wall 13 of the drum 12 has secured thereto by means of the screws 40 the stepped hub extension 41 which as a whole is held against longitudinal movement on the driving shaft 1 between the collar 17 and collar 42.

43 designates spring pressed pawls located around the periphery of the hub extension 41 and are adapted to engage the internal ratchet 44 of the gear 6 to hold the same to move with the gear member when said gear is operated to transmit motion from the driving shaft to the driven shaft. This ratchet and pawl connection between the disks 12 and 13 of the gear members 9 and 10 and the gears 6 and 7 allows for an overrunning of a gear of a lesser speed ratio when changing to a gear of a higher speed ratio.

45 designates a retaining plate secured to the hub 41 of the drum 12 to retain the gear 6 against longitudinal movement.

In the high speed unit C the gear member 11 which comprises the gear 8 is of the same construction and operation as that of the gear members 9 and 10 with the exception that the ratchet and pawl connection between the gear 8 and the shaft 1 is eliminated, there being no necessity for an overrunning device in connection with the gear of the high speed ratio.

46 designates bifurcated members engaging the cam disk 21 to move the same longitudinally in the operation thereof. These bifurcated members are secured to slide blocks 47 mounted to slide on the bars 48 secured to and positioned between the side frames or stationary elements 49 of the device. The slide blocks 47 are recessed in their lower portion as at 50 and in said recess a rack 51 is provided which meshes with a segmental gear 52 fixed to a shaft 53 which is loosely journaled in the stationary bearings 54.

55 designates crank arms fixed to the shafts 53, these crank arms are provided with rollers 56 adapted to engage in a cam slot 57 formed in a shiftable cam bar 58 positioned to slide in the grooved members 59 secured between the side frames. This cam bar 58 is provided with a suitable lever connection 59* whereby the movement thereof may be controlled by the operator from a remote location.

The cam slot 57 is formed of dwell or inoperative portions 60, 61, 62 and 63 and at predetermined distances with the operative portions 64, 65 and 66 representing the low, intermediate and high speed ratios. In the neutral position of the device the rollers 56 engage in the inoperative portions of the cam slot 57 and when the device is in operation, that is, when the cam bar is shifted to the direction indicated by the arrow, see Fig. 2, the rollers 56 can be selectively caused to successively engage in the operative portions 64, 65 and 66 of the cam slot 57 to cause the successive operation of the gear members on the driving shaft.

Referring to Figs. 7, 8, 9 and 10, another embodiment of my invention is shown in which is included a reversing mechanism interposed between the driving shaft 1 and driven shaft 2. The description of the mechanism and operation of the gear units D, E and F thereof is similar to that of the gear units A, B, and C, hereinbefore described and shown in Figs. 1, 2, 3, 4, 5, and 6 of the drawings.

G and H designate gear units of the reversing mechanism of low and high speed ratios which comprise the gears 67 and 68 fixed to revolve with the driving shaft 1 and the gear members 69 and 70 loosely mounted on the driven shaft.

The gear member 69 comprises the gear 71 which is provided with a yielding connection with the driven shaft in a similar manner as that of the gears 9 and 10 mounted on the driving shaft.

The gear member 70 comprises the gear 72 formed integral with the drum 12 in a similar manner as that of the gear 8 of the gear member 11 wherein the yielding connection between the gear and the shaft is eliminated.

The reversal in the transmission of motion between the driving and driven shafts, see Fig. 9, is secured by the insertion of the idler gears 73 and 74 between the gears 67 and 68 fixed on the driving shaft and the gears 71 and 72 loosely mounted on the driven shaft 2.

75 designates the reversing shiftable cam bar having a cam slot 76 formed at predetermined distances of dwell or inoperative portions 77 and 78 and operative portions 79 and 80 representing low, and high speed ratios.

The operative mechanism between the reversing shiftable cam bar 75 and the reversing gear members 69 and 70 is similar to the mechanism controlling the gear members on the driving shaft.

In the operation of my speed changing mechanism shown in Figs. 1, 2, 3, 4, 5, and 6, the operator controls the transmission of motion from the driving shaft 1 to the driven shaft or axle 2 through the medium of the shaftable cam bar 58 having the cam slot 57 formed of the dwell or inoperative portions 60, 61, 62 and 63 and the operative portions 64, 65 and 66, representing the low, intermediate and high speed ratios.

Normally the device is in a neutral position with the rollers 56 of the clutch shoe control mechanism engaging in the inoperative portions 60, 61, 62 and 63 of the cam slot 57 to hold the clutch shoes 16 out of engagement with the internal faces 15 of the drums 12.

When it is desired to transmit motion of a desired speed ratio, the operator shifts the cam bar 58 in the direction indicated by the arrow, Fig. 2, of the drawings to cause the roller 56 of the clutch shoe to control mechanism of the gear unit A of the low speed ratio to ride from the inoperative portion 60 of the cam slot 57 into the operative portion 64 thereof, representing the low speed ratio, as shown in Fig. 2 of the drawings, imparting a rocking movement to the segmental gear 50 meshing with the rack 51 to move the slide block 47 which is in operative connection with the cam disk 21 whereby the disk 21 is moved longitudinally inward toward the drum 12 to expand the clutch shoes 16 against the internal face 15 of the drum 12 to hold the same in a fixed relation to the driving shaft 1 to transmit motion of the low speed ratio to the driven shaft or axle 2 for traction purposes.

In operation when the disk 21 is moved inward to operate the device, see Figs. 4 and 5 of the drawings, the resilient extension 23 to which through the pivotal connection of the link 31 and the rigid extension 33, the clutch shoes are connected, is caused to be sprung downward in the inward movement against its own spring tension and against the tension of the spring 26 acting against the rigid arm 22, in this manner, an efficient clutch is effected between the shoes 16 and the drum 12.

In changing from one speed to another the operator shifts the cam bar 58 to progressively cause the successive operation of the rollers 56 of the different speed ratio control mechanisms to engage in their respective operative cam portions 64, 65 and 66, representing the low, intermediate and high speed ratios.

In the operation of the embodiment of my invention shown in Figs. 7, 8, 9 and 10 the operator controls the transmission of direct motion from the driving shaft to the driven shaft in a similar manner as that heretofore described and shown in Figs. 1, 2, 3, 4, 5 and 6 of the drawings. The operation in the reversal of the motion transmitted from the driving shaft to the driven shaft consists in providing the additional shiftable cam bar 75 for controlling the operation of the gear members 69 and 70 on the driven shaft which are in constant transmission connection with the gears 67 and 68 on the driving shaft through the intermediacy of the idler or reversing gears 73 and 74.

Having thus described my invention what I claim as new and desire to secure by Letters Patent, is:—

1. A speed changing mechanism comprising a driving shaft, a driven shaft, intermeshing gear units of different speed ratios connecting said shafts, the gears of each unit being always in mesh, one gear of a unit being fixed on said driven shaft, another gear of the same unit loose on said driving shaft, clutch mechanism associated with each of said loosely mounted gears, means for operating said clutch mechanism to hold a selected loose gear to revolve with said driving shaft, and means whereby an overrunning action is caused in a loose gear of a lesser speed ratio in changing therefrom to that of a loose gear of a higher speed ratio.

2. A speed changing mechanism comprising a driving shaft, a driven shaft, intermeshing gear units of different speed ratios connecting said shafts, the gears of each unit being always in mesh, one gear of a unit being fixed on said driven shaft, another gear of the same unit loose on said driving shaft, clutch mechanism associated with each of said loosely mounted gears, means for progressively operating said clutch mechanism to hold a selected loose gear to revolve with said driving shaft, and means whereby an overrunning movement is caused in a loose gear of a lesser speed ratio in changing therefrom to that of a loose gear of a higher speed ratio in the transmission of motion from said driving shaft to said driven shaft.

3. A speed changing mechanism comprising a driving shaft, a driven shaft, intermeshing gear units of different speed ratios connecting said shafts, the gears of each unit being always in mesh, one gear of a unit being fixed on said driving shaft, another gear of the same unit loose on said driving shaft, clutch mechanism associated with each of said loose gears, said clutch mechanism rotatably secured to and longitudinally movable on said driving shaft, each of said clutches consisting of a plurality of radially expansible contact shoes, means for expanding said contact shoes into frictional contact with a selected loose gear to hold the same to revolve with said driving shaft, and ratchet and pawl connection between said clutch and said loose gears to allow for an overrunning of a gear of lesser speed ratio in changing to that of a gear of a higher speed ratio.

4. A speed changing mechanism, comprising a driving shaft, a driven shaft, intermeshing gear units of different speed ratios connecting said shafts, the gears of each unit being always in mesh, one gear of a unit being fixed on said driven shaft, another gear of the same unit loose on said driving shaft, clutch mechanism associated with each of said loose gears, said clutch mechanism rotatably secured to and longitudinally movable on said driving shaft, said clutches consisting of a plurality of radially expansible contact shoes, means for expanding said contact shoes into frictional contact with a selected loose gear to hold the same to revolve with said driving shaft, means for exerting an outward spring tension against said shoes when said shoes are expanded into frictional contact with said loose gear, and means interposed between and connected to said clutch mechanism and said loose gears to allow for an overrunning movement of a gear of lesser speed ratio in changing to a gear of higher speed ratio.

5. A speed changing mechanism comprising a driving shaft, a driven shaft, intermeshing gear units of different speed ratios connecting said shafts, the gears of each unit being always in mesh, one gear of a unit being fixed on said driven shaft, another gear of the same unit loose on said driving shaft, said loose gear of each gear unit connected through a ratchet and pawl device to a drum loosely mounted on said driving shaft, clutch mechanism associated with said drum, said clutch mechanism consisting of a plurality of radially expansible contact shoes rotatably secured to said driving shaft, means connected with said contact shoes adapted to be moved longitudinally on said driving shaft to expand said contact shoes to frictionally contact with the inner periphery of said drum to hold the said drum to revolve with the driving shaft to revolve a selected loose gear, and means for exerting tension against said contact shoes when expanded into frictional contact with said drum.

6. A speed changing mechanism consisting of a driving shaft and a driven shaft which comprise in combination several intermeshing gear units of different speed ratios for the transmission of direct and reverse motion, said gear units interposed between and connecting said shafts, the gears of each unit being always in mesh, one gear of each unit loosely mounted on its respective shaft, the other gear of each gear unit fixed on the respective shaft, an idler gear included in the gear unit of the reverse motion, clutch mechanism associated with each of said loosely mounted gears, means for operating said clutches to hold a selected loose gear to revolve with its respective shaft, and means whereby an overrunning action is caused in a loose gear of a lesser speed ratio in changing therefrom to that of a loose gear of a higher speed ratio.

7. A speed changing mechanism consisting of a driving shaft and a driven shaft which comprise in combination several intermeshing gear units of different speed ratios for the transmission of direct and reverse motion from said driving shaft to said driven shaft, said gear units interposed between and connecting said shafts, the gears of each unit being always in mesh, one gear of each unit loosely mounted on its respective shaft, the other gear of each unit fixed on its respective shaft, a reversing idler gear included in the gear units of the reverse motion, clutch mechanism associated with each of said loosely mounted gears, said clutch mechanism rotatably secured to and longitudinally movable on its respective shaft and consisting of a plurality of radially expansible contact shoes, cam means for expanding said contact shoes into frictional contact with a selected loose gear to hold the said gear to revolve with its respective shaft, and means whereby an overrunning action is caused in a loose gear of a lesser speed ratio in changing therefrom to that of a loose gear of a higher speed ratio.

8. A speed changing mechanism consisting of a driving shaft, and a driven shaft which comprise in combination several intermeshing gear units of different speed ratios for the transmission of direct and reverse motion from said driving shaft to said driven shaft, said gear units interposed between and connecting said shafts, the gears of each unit being always in mesh, one gear of each unit loosely mounted on its respective shaft, the other gear of each unit fixed on its respective shaft, a reversing idler gear included in the gear units of the reverse motion, clutch mechanism associated with each of said loosely mounted gears, said clutch mechanism rotatably secured to and longitudinally movable on its respective shaft and consisting of a plurality of radially expansible contact shoes, cam means for expanding said contact shoes into frictional contact with a selected loose gear to hold the said gear to revolve with its respective shaft, means for exerting an outward spring tension against said shoes when said shoes are moved into frictional contact with said loose gear, and means whereby an overrunning action is caused in a loose gear of a lesser speed ratio in changing therefrom to that of a loose gear of a higher speed ratio.

9. A speed changing mechanism consisting of a driving shaft and a driven shaft, which comprise in combination several intermeshing gear units of different speed ratios for the transmission of direct and reverse motion from said driving shaft to said driven shaft, said gear units interposed between and connecting said shafts, the gears of each unit being always in mesh, one gear of each unit loosely mounted on its respective shaft, the other gear of each unit fixed on its respective shaft, a reversing idler gear included in the gear units of the reverse motion, said loose gear of each gear unit being connected through a ratchet and pawl connection to a drum loosely mounted on its respective shaft, clutch mechanism associated with said drum and consisting of a plurality of radially expansible contact shoes rotatably secured to said respective shaft, means connected with said contact shoes adapted to be moved longitudinally on said respective shaft to expand said shoes to frictionally engage the inner periphery of said drum to hold the same to revolve with its respective shaft, means for exerting an outward spring tension against said shoes when said shoes are operated to hold said drum to revolve with its respective shaft.

10. A speed changing mechanism consisting of a driving and a driven shaft which comprise in combination, several intermeshing gear units of different speed ratios for the transmission of direct and reverse motion from said driving shaft to said driven shaft, said gear units interposed between and connecting said shafts, the gears of each unit being always in mesh, one gear of each unit loosely mounted on its respective shaft, the other gear of each unit fixed on its respective shaft, a reversing idler gear included in the gear units of the reverse motion, clutch mechanism associated with each of said loose gears, overrunning mechanism interposed between said loose gear and said clutch mechanism, separate means for the operation of said clutches on said driving and said driven shafts, to hold the selected loose gear fixed to its respective shaft for the said direct and reverse transmission of motion.

11. A speed changing mechanism consisting of a driving and a driven shaft which comprise in combination several intermeshing gear units of different speed ratios for the transmission of direct and reverse motion from said driving shaft to said driven shaft, said gear units interposed between and connecting said shafts, the gears of each unit being always in mesh, one gear of each unit loosely mounted on its respective shaft, the other gear of each unit fixed on its respective shaft, a reversing idler gear included in the gear units of the reverse motion, clutch mechanism associated with each of said loose gears, overrunning mechanism interposed between said loose gear and said clutch mechanism, means for holding all the loose gears for the transmission of reverse motion in a neutral position, and means for progressively selecting and holding said loose gear in a fixed relation to its respective shaft for the transmission of direct motion.

12. A speed changing mechanism consisting of a driving and a driven shaft which comprises in combination several intermeshing gear units of different speed ratios for the transmission of direct and reverse motion from said driving shaft to said driven shaft, said gear units interposed between and connecting said shafts, the gears of each unit being always in mesh, one gear of each unit loosely mounted on its respective shaft, the other gear of each unit fixed on its respective shaft, a reversing idler gear included in the gear units of the reverse motion, clutch mechanism associated with each of said loose gears, overrunning mechanism interposed between said loose gear and said clutch mechanism, means for holding all the loose gears for the transmission of direct motion in a neutral position, and means for progressively selecting and holding said loose gear in a fixed relation to its respective shaft for the transmission of reverse motion.

BARTON S. KURTZ.

Witnesses:
AMANDA A. DILLER,
CHESTER A. DILLER.